United States Patent
Ali

(10) Patent No.: US 8,260,073 B2
(45) Date of Patent: *Sep. 4, 2012

(54) SELECTIVE LOCAL TRANSIENT IMPROVEMENT AND PEAKING FOR VIDEO SHARPNESS ENHANCEMENT

(75) Inventor: Walid S. Ibrahim Ali, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/101,806

(22) Filed: May 5, 2011

(65) Prior Publication Data

US 2011/0211767 A1    Sep. 1, 2011

Related U.S. Application Data

(63) Continuation of application No. 12/652,130, filed on Jan. 5, 2010, now Pat. No. 7,957,605, which is a continuation of application No. 11/321,690, filed on Dec. 29, 2005, now Pat. No. 7,668,387, which is a continuation-in-part of application No. 11/157,335, filed on Jun. 20, 2005, now Pat. No. 7,676,103, and a continuation-in-part of application No. 11/184,688, filed on Jul. 19, 2005, now Pat. No. 7,653,257.

(51) Int. Cl.
*G06K 9/40* (2006.01)

(52) U.S. Cl. .......................................... 382/254

(58) Field of Classification Search .............. 382/191, 382/232–233, 240, 248, 254, 260, 263, 265–266, 382/274; 348/384.1, 395.1, 398.1, 403.1–405.1, 348/408.1–409.1, 424.2, 431.1; 375/240.02, 375/240.11, 240.18–240.19; 708/317, 400–401

See application file for complete search history.

(56) References Cited

U.S. PATENT DOCUMENTS

| | | | |
|---|---|---|---|
| 4,812,903 | A | 3/1989 | Wagensonner et al. |
| 5,703,965 | A | 12/1997 | Fu et al. |
| 5,805,721 | A | 9/1998 | Vuylsteke et al. |
| 5,880,767 | A | 3/1999 | Liu |
| 5,889,559 | A | 3/1999 | Yang |
| 6,018,596 | A | 1/2000 | Wilkinson |
| 6,021,228 | A | 2/2000 | Byrd |

(Continued)

FOREIGN PATENT DOCUMENTS

JP    63-059255    3/1988

(Continued)

OTHER PUBLICATIONS

Japan Patent Office, Office Action for JP Application No. 2008-539134, dated Oct. 12, 2010, 1 page.

(Continued)

*Primary Examiner* — Jose Couso
(74) *Attorney, Agent, or Firm* — Trop, Pruner & Hu, P.C.

(57) ABSTRACT

A method of selectively sharpening an image may include, for at least some pixels in the image, determining a frequency content associated with a pixel value in the image. The pixel may be linearly sharpened if the frequency content exceeds a threshold. The pixel may be non-linearly sharpened if the frequency content does not exceed the threshold. In some implementations, the non-linear sharpening may include wavelet decomposition of the image and enhancement of decomposed components.

27 Claims, 7 Drawing Sheets

U.S. PATENT DOCUMENTS

| | | |
|---|---|---|
| 6,141,446 A | 10/2000 | Boliek et al. |
| 6,600,518 B1 | 7/2003 | Bakhmutsky et al. |
| 6,611,627 B1 | 8/2003 | LaRossa et al. |
| 6,697,534 B1 | 2/2004 | Tan et al. |
| 6,711,299 B2 | 3/2004 | Chao et al. |
| 7,391,901 B2 | 6/2008 | de Queiroz et al. |
| 7,653,257 B2 * | 1/2010 | Ali et al. ............... 382/263 |
| 7,668,387 B2 * | 2/2010 | Ali ............... 382/254 |
| 7,676,103 B2 * | 3/2010 | Ali ............... 382/240 |

FOREIGN PATENT DOCUMENTS

| | | |
|---|---|---|
| JP | 2002-024821 | 1/2002 |
| JP | 2002-245450 | 8/2002 |

OTHER PUBLICATIONS

Roger L. King and Jianwen Wang, "A Wavelet Based Algorithm for Pan Sharpening Landsat 7 Imagery", 2001 IEEE, pp. 849-851.

* cited by examiner $$\begin{pmatrix} -1 & 0 & -2 & 0 & -1 \\ 0 & 0 & 0 & 0 & 0 \\ -2 & 0 & 12 & 0 & -2 \\ 0 & 0 & 0 & 0 & 0 \\ -1 & 0 & -2 & 0 & -1 \end{pmatrix}\ \Big\} 410$$

SELECTIVE LOCAL TRANSIENT IMPROVEMENT AND PEAKING FOR VIDEO SHARPNESS ENHANCEMENT

CROSS-REFERENCE TO RELATED APPLICATIONS

The present application is a continuation of application Ser. No. 12/652,130, filed on Jan. 5, 2010, now U.S. Pat. No. 7,957,605 which is a continuation of application Ser. No. 11/321,690, filed on Dec. 29, 2005, which issued as U.S. Pat. No. 7,668,387, which is a continuation-in-part of application Ser. No. 11/157,335, filed on Jun. 20, 2005, which issued as U.S. Pat. No. 7,676,103, the content of which is hereby incorporated by reference, and is also a continuation-in-part of application Ser. No. 11/184,688, filed on Jul. 19, 2005, which issued as U.S. Pat. No. 7,653,257, the content of which is hereby incorporated by reference.

BACKGROUND

Implementations of the claimed invention generally may relate to schemes for enhancing video information and, more particularly, to such schemes that alter the sharpness of the video information.

Video information may be transmitted via a medium in time and/or space for viewing at a separate time and/or location. In some cases, the medium may be a transmission medium, such as carrier waves (e.g., terrestrial and/or cable-carried) or protocol-based data networks. In some cases, the medium may be a storage medium (e.g., tape, hard disk, digital video disc (DVD), etc.) that may store the video information prior to its display. Typically, the video data may be encoded into one of a number of formats before transmission. Some encoding formats may include, but are not limited to, MPEG-1, MPEG-2, MPEG-4, Advanced Video Coding (AVC) (e.g., MPEG-4, part 10 and ITU-T Recommendation H.264), Windows Media Video 9 (WMV-9), and/or SMPTE's VC-1.

Such encoding of video information may remove (e.g., by quantizing, etc.) some higher-frequency content in the original video information. The decoded information may appear smoothed and/or somewhat fuzzy when displayed. This phenomenon may not be unique to encoded video data, but may also be present in, for example, transmitted analog video due to impediments in the transmission path. Thus, it may be desirable to increase the sharpness of received and/or decoded video data to improve its perceived picture quality.

To further introduce the concept of sharpening video, a one-dimensional example will be discussed with regard to FIGS. 1A and 1B. An image in a video sequence may include, for example, luma and chroma signals (e.g., Y, U, and V) sampled in both the horizontal and vertical directions. When the image is roughly uniform in a certain area, the sample values may be substantially the same. When an edge (e.g. a horizontal edge) exists in the image, however, the sample values in the horizontal direction may undergo an abrupt change in value. FIG. 1A illustrates a one-dimensional plot 110 of luma values that change somewhat abruptly over a number of pixels.

To sharpen the video signal, overshoots/undershoots may be generated in the signal (e.g., Y, U or V) by adding the second derivative (e.g., $d^2Y/dx^2$) of plot 110 to itself. FIG. 1B illustrates a plot 120 that has been so sharpened by the addition of undershoot 130 and overshoot 140. Adding overshoot/undershoot 140/130 may boost perceived, higher frequency components. Because plot 120 may have steeper edges than plot 110, its transition may be perceived as visually sharper than that of unsharpened plot 110.

Some schemes for increasing the sharpness of video information, however, may also increase noise within the video information to unacceptable levels.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings, FIGS. 1A and 1B conceptually illustrate sharpening a video signal.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1A:
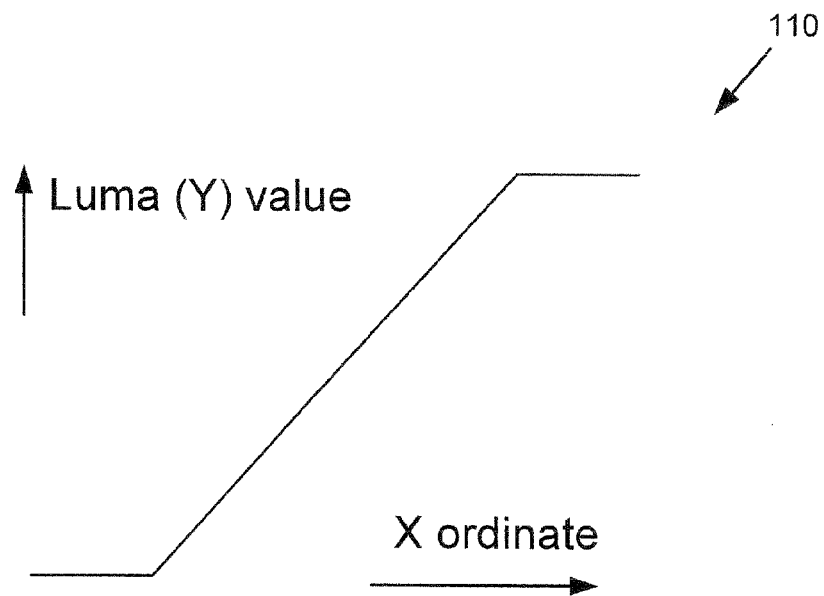
Figure 1B:
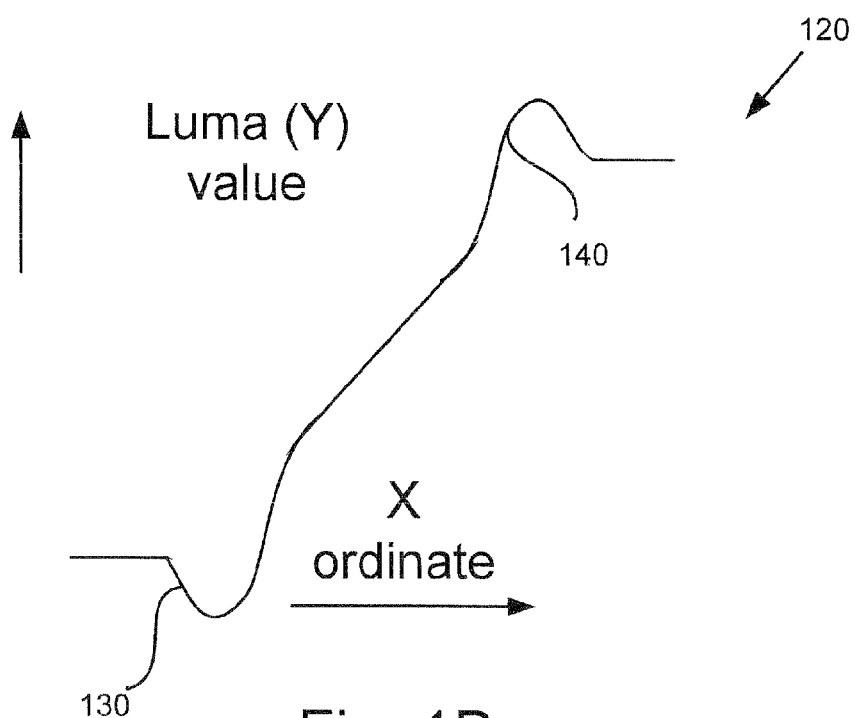
Figure 2:
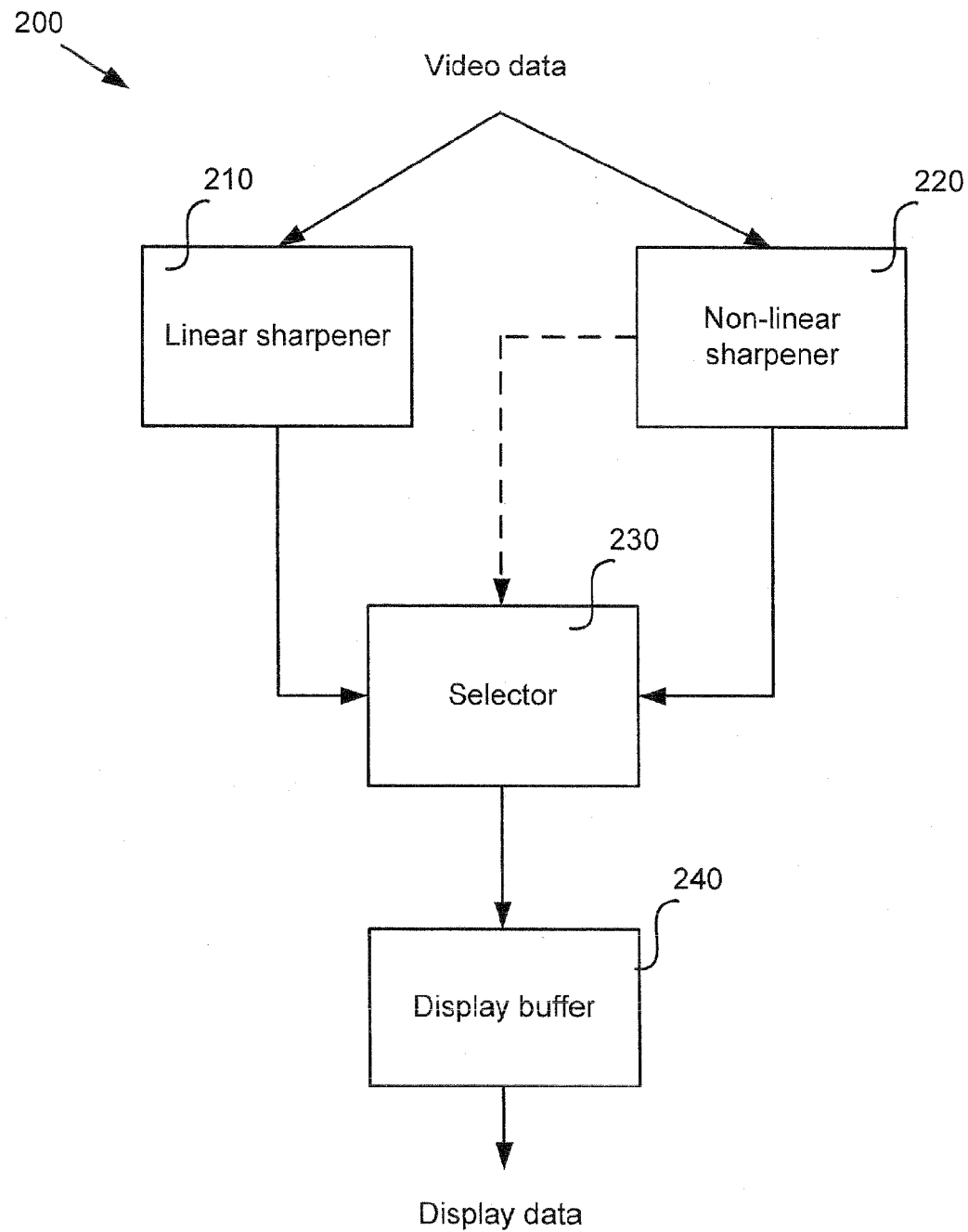
FIG. 2 illustrates a portion of a video display system.

FIG. 2 illustrates a portion of a video display system 200. System 200 may receive video information from any suitable medium, including but not limited to various transmission and/or storage media. Although illustrated as separate functional elements for ease of explanation, any or all of the elements of system 200 may be co-located and/or implemented by a common group of gates and/or transistors. Further, system 200 may be implemented via software, firmware, hardware, or any suitable combination thereof.

In various implementations, system 200 may include, or be part of, one or more of a processing system, a processing sub-system, a processor, a computer, a device, an encoder, a decoder, a coder/decoder (CODEC), a filtering device (e.g., graphic scaling device, deblocking filtering device), a transformation device, an entertainment system, a display, or any other processing architecture. The implementations are not limited in this context.

The portion of display system 200 shown in FIG. 2 may include a linear sharpener 210, a non-linear sharpener 220, a selector 230, and a display buffer 240. The video data input to system 200 may have been decoded from any of a number of encoding schemes that may include, but are not limited to, MPEG-1, MPEG-2, MPEG-4, Advanced Video Coding (AVC) (e.g., MPEG-4, part 10 and ITU-T Recommendation H.264), Windows Media Video 9 (WMV-9), and/or SMPTE's VC-1.

Linear sharpener 210 may function to selectively sharpen a stream of video images. In some implementations, linear sharpener 210 may differently sharpen certain portions of a picture in the video stream based on their amplitudes and/or their neighboring pixels.

Figure 3:
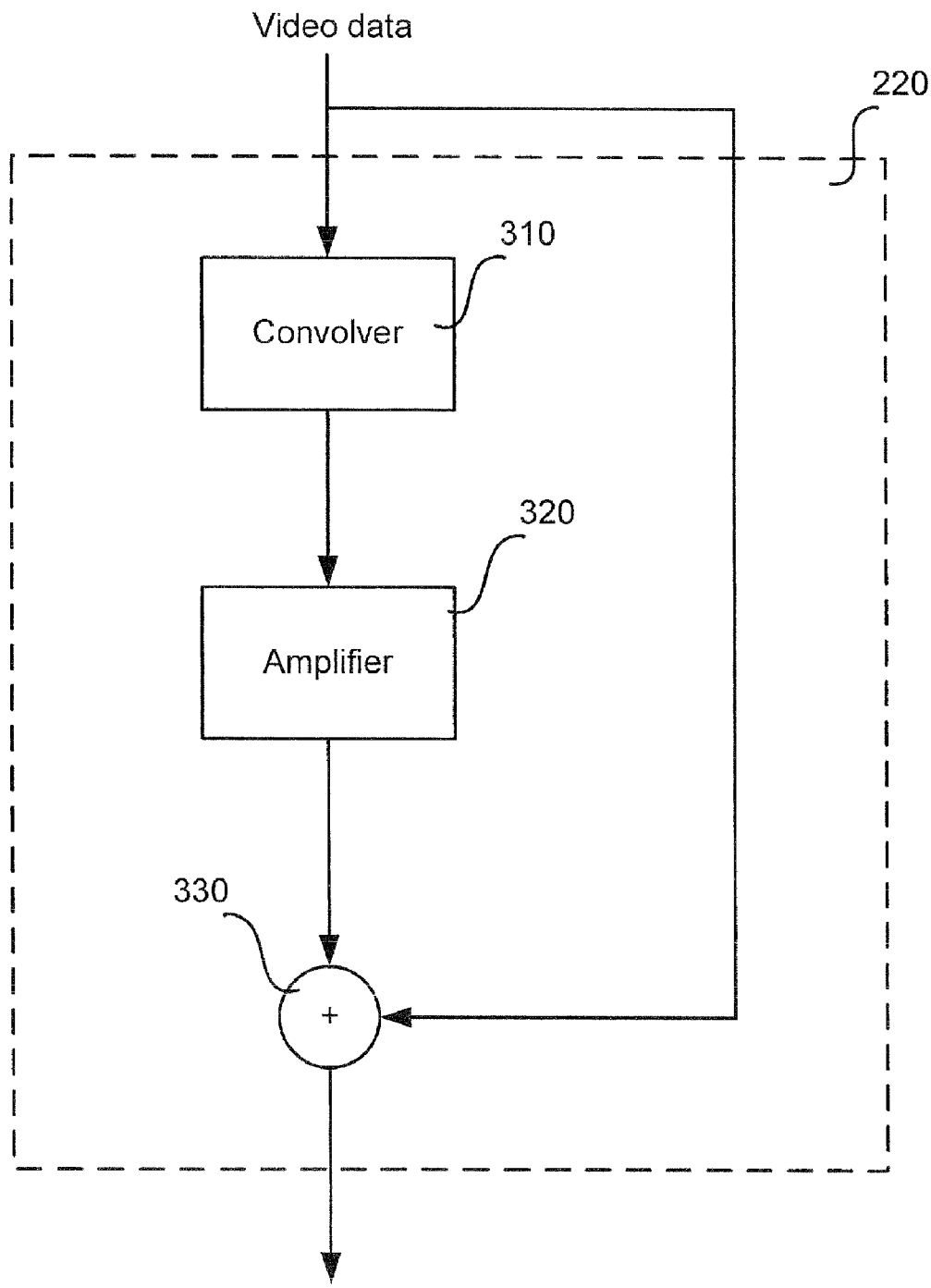
FIG. 3 illustrates an exemplary linear sharpener in the system of FIG. 2.

FIG. 3 illustrates an implementation of linear sharpener 210. Linear sharpener 210 may include a convolver 310, an amplifier 320, and a combiner 330. Although illustrated as being connected in a certain manner for ease of illustration, linear sharpener 210 in FIG. 3 may be connected in other configurations. For example, in some implementations, combiner 330 may be located before amplifier 320, instead of after as shown. Other variations are both possible and contemplated.

Convolver 310 may be arranged to sharpen a pixel (e.g., Y, U, and/or V component) of video data by adding content to the pixel. Convolver 310 may convolve a two-dimensional (2D) Laplacian kernel with a number of pixels surrounding the pixel in question to obtain a derivative value. Such derivative value, the output of convolver 310, may be referred to as a sharpening value.

Figures 4, 5:
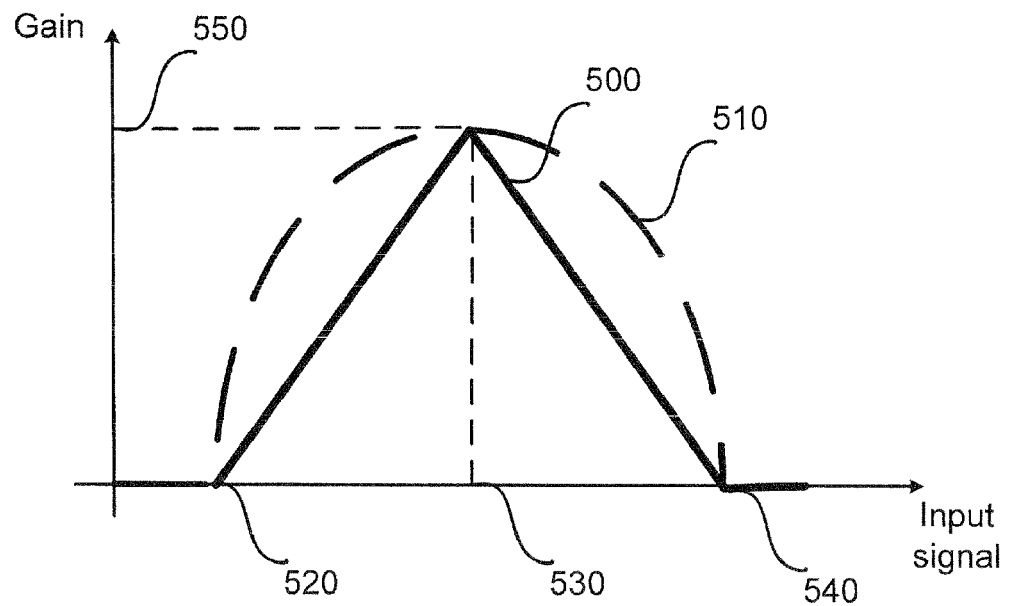
FIG. 4 conceptually illustrates an example convolution kernel.
FIG. 5 illustrates an exemplary gain profile of an amplifier in the linear sharpener of FIG. 3.

For example, in some implementations, convolver 310 may use a 5×5 kernel, such as Laplacian convolution kernel 410 shown in FIG. 4. Convolver 310 may convolve kernel 410 with, for example, the 5×5 luma data containing the pixel in question to obtain the 2D derivative of the luma signal. The output of convolver 310 may be, for example, a 7×7 array as a result of convolution of the 5×5 luma (or chroma) data with the 5×5 kernel. The sharpening value output by convolver 310 may be the center value of such resulting array that corresponds to the pixel in question.

Other variations than this specific example are contemplated. For example, a different-sized kernel may be used by convolver 310 than kernel 410. In some implementations, the same or different kernels may be used for luma (e.g., Y) and chroma (e.g., U and/or V) video data. In some implementations, only the luma data may be convolved, while passing the chroma data unaltered.

Returning to FIG. 3, amplifier 320 may be arranged to selectively increase the sharpening value from convolver 310 to produce an amplified value. In some implementations, amplifier 320 may apply a nonlinear gain curve that depends on the input, sharpening values to produce amplified values. For example, in some implementations, amplifier 320 may not supply (and/or apply) gain to those sharpening values that do not exceed around 5% (or another relatively small threshold) of the overall dynamic range of the pixel values that are input to convolver 310. Such selective amplification by amplifier 320 may avoid amplifying noise below a certain signal level (e.g., preventing "coring" in a final, sharpened pixel value output by combiner 330). Similarly, in some implementations, amplifier 320 also may not supply and/or apply gain to sharpening values that exceed a certain threshold. In this manner, amplifier 320 may also prevent clipping in the final, sharpened pixel value output by combiner 330.

FIG. 5 illustrates an exemplary gain profile 500 of amplifier 320. In some implementations, there may exist a desired or preferred gain profile 510, shown as a dashed line. In the implementation of FIG. 5, gain profile 500 may be a piecewise linear approximation of desired profile 510. Other implementations are possible and contemplated, however, such as a curvilinear approximation of desired profile 510 (e.g., a quadratic or cubic function). In some implementations, desired profile 510 may be implemented exactly, such as via a look-up table.

Gain profile 500 may illustrate the gain (or gain scale factor) of amplifier 320 versus the input signal (e.g., the sharpening value from convolver 310, which may be luminance and/or chrominance). Gain profile 500 may be substantially zero up to a coring point 520, may generally increase between coring point 520 and an intermediate point 530, may generally decrease between intermediate point 520 and a clipping point 540, and may be substantially zero beyond clipping point 540. A maximum value 550 of profile 500 may occur when the input value is at intermediate point 530.

In some implementations, (e.g., where a full scale value of may be 255, corresponding to 8 bits), coring point 520 may be about 40, and intermediate point 530 may be about 50. In some implementations, clipping point 540 may be a suitable value to prevent clipping in the final, sharpened pixel value output by combiner 330. In some implementations, maximum value 550 may be set to 125, almost half of the full scale value. Other values are possible, however. It should be noted that the non-zero portions of gain profile 500 need not be symmetrical about intermediate point 530.

Returning to FIG. 3, although amplifier 320 (and associated gain profile in FIG. 5) has been described as operating based on the sharpening values output by convolver 310, in some implementations amplifier 320 may operate based on the video data (e.g., pre-sharpened values) input to convolver 310. In some implementations, amplifier 320 may operate based on the combination of the pre-sharpened pixel data and the sharpening values output by convolver 310. Regardless of which data amplifier 320 operates based upon, it may function to prevent coring and/or clipping in the sharpened pixel values output by combiner 330.

Combiner 330 may combine the amplified values from amplifier 320 with pixel values that were input to convolver 310 to output sharpened pixel values. In some implementations, combiner 330 may include an adder to add an amplified value from amplifier 320 to a corresponding unsharpened pixel value. In some implementations, combiner 330 may include other logic to arithmetically (e.g., subtracter, multiplier, etc.) and/or logically (e.g., AND, XOR, etc.) combine an amplified values to corresponding pixel values as appropriate.

Returning to FIG. 2, non-linear sharpener 220 may function to selectively sharpen a stream of video images. In some implementations, non-linear sharpener 220 may differently sharpen certain portions of a picture in the video stream based on a frequency-based, non-linear transformation of the images.

Figure 6:
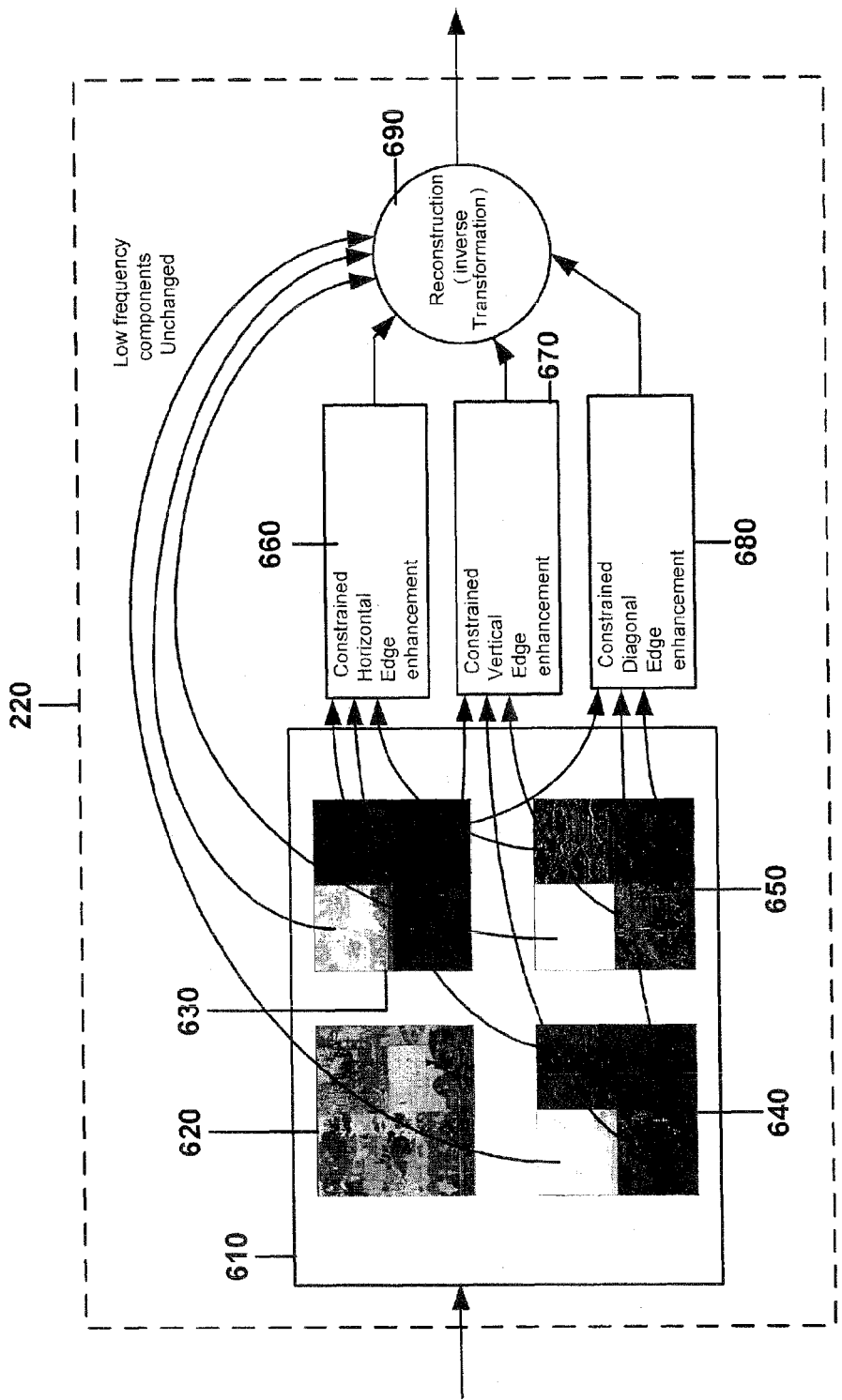
FIG. 6 illustrates an exemplary non-linear sharpener in the system of FIG. 2.

FIG. 6 illustrates an implementation of non-linear sharpener 220. Non-linear sharpener 220 may include a wavelet decomposition module 610, a horizontal edge enhancement module 660, a vertical edge enhancement module, a diagonal edge enhancement module 680, and a reconstruction module 690.

Wavelet decomposition module 610 may be arranged to receive an input image 620. Input image 620 may include, for example, a picture in a video sequence including signals (e.g., Y, U, and V) sampled in both the horizontal and vertical directions. The implementations are not limited in this context.

In various implementations, the wavelet decomposition module 610 may be arranged to perform wavelet decomposition. The wavelet decomposition may include two-dimensional orthogonal wavelet decomposition, for example. The wavelet decomposition may automatically detect edge information in any general direction in the signal components (e.g., YUV or RGB). It can be appreciated that various wavelet decompositions may be used. The implementations are not limited in this context.

In various implementations, wavelet decomposition may include determining the location of the edges as well as making the edges steeper by modifying the constituent frequency components. The wavelet decomposition may include performing wavelet analysis for edge detection and/or transient processes. The edge information may be decomposed via a wavelet filter bank, for example, and the frequency-amplitude distribution for the edges may be adaptively changed. The wavelets may include time aspects and scale or space aspects, which enable analysis in both time and space for any physical phenomenon. Wavelet analysis may include a windowing technique with variable-sized regions. Wavelet analysis may allow the use of long time intervals where more precise low-frequency information is desired, and the use of shorter regions where high-frequency information is desired. The implementations are not limited in this context.

The wavelet decomposition may include employing a wavelet transform. In various implementations, the wavelet transform may include a two-dimensional discrete wavelet transform (2D-DWT) such as a Debauchies wavelet transform, for example. In various implementations, the wavelet transform may use dyadic scales and positions following a geometric sequence of ratio two in order to reduce the amount of wavelet coefficient calculations. The dyadic wavelet transform improves efficiency and generally is just as accurate. The implementations are not limited in this context.

In various implementations, the wavelet decomposition may include performing multiple levels of decomposition. In one implementation, for example, the wavelet decomposition may include three levels of decomposition. The 2D-DWT, for example, may decompose an image into a low-detail component and three higher-detail components (e.g., including higher-frequency information) in a horizontal direction, in a vertical direction, and in a diagonal direction. Those familiar with DWT may recognize that after a first-level decomposition, a resulting low-detail component may be successively decomposed in second, third, etc. level decompositions. The implementations are not limited in this context.

Wavelet decomposition module 610 may arranged to perform wavelet decomposition on original image 620. In various implementations, the wavelet decomposition module 610 may perform a three-level, two-dimensional wavelet decomposition (e.g., 2D-DWT) to generate a first level decomposition 630, a second level decomposition 640, and a third level decomposition 650. The implementations are not limited in this context.

Horizontal edge enhancement module 660, vertical edge enhancement module, and diagonal edge enhancement module 680 may be arranged to change the decomposition output (e.g., 2D-DWT output). In various implementations, horizontal, vertical and diagonal enhancement may be applied only to the detail components (e.g., higher frequency) of the wavelet decomposition, while the approximation component (e.g., lower frequency) of every level of wavelet decomposition may be passed to reconstruction module 690 without any enhancement. Such may ensure the sharpness enhancement method does not respond to the low frequency components in the image, but rather to the mid and high frequency components. The implementations are not limited in this context.

In various implementations, the horizontal edge enhancement module 660, the vertical edge enhancement module, and the diagonal edge enhancement module 680 may be arranged to pad higher frequency components with more components, which fit the decomposed components. The different decomposition levels may be treated differently (soft threshold), based on the relative amount of energy in every decomposition level. In various implementations, the 2D-DWT decomposition may be modified by boosting the high frequency components in the horizontal, vertical and diagonal directions at the first level with a factor t1, at the second level with a factor t2, and at the third level with a factor t3, where t1>t2>t3. The implementations are not limited in this context.

Horizontal edge enhancement module 660 may boost the high frequency components from the first level decomposition 630 in the horizontal direction by a first enhancement factor $t_h1$. The horizontal edge enhancement module 660 may boost the high frequency components from the second level decomposition 640 in the horizontal direction by a second enhancement factor $t_h2$. The horizontal edge enhancement module 660 may boost the high frequency components from the third level decomposition 650 in the horizontal direction by a third enhancement factor $t_h3$ ($t_h1 > t_h2 > t_h3$). The implementations are not limited in this context.

Vertical edge enhancement module 670 may boost the high frequency components from the first level decomposition 630 in the vertical direction by a first enhancement factor $t_v1$. The vertical edge enhancement module 670 may boost the high frequency components from the second level decomposition 640 in the vertical direction by a second enhancement factor $t_v2$. The vertical edge enhancement module 670 may boost the high frequency components from the third level decomposition 650 in the vertical direction by a third enhancement factor $t_v3$ ($t_v1 > t_v2 > t_v3$). The implementations are not limited in this context.

Diagonal edge enhancement module 680 may boost the high frequency components from the first level decomposition 630 in the diagonal direction by a first enhancement factor $t_d1$. The diagonal edge enhancement module 680 may boost the high frequency components from the second level decomposition 640 in the diagonal direction by a second enhancement factor $t_d2$. The diagonal edge enhancement module 680 may boost the high frequency components from the third level decomposition 650 in the diagonal direction by a third enhancement factor $t_d3$ ($t_d1 > t_d2 > t_d3$). The implementations are not limited in this context.

Reconstruction module 690 may be arranged to perform reconstruction using the modified decomposition levels. In various implementations, the reconstruction module 690 may receive the enhanced horizontal, vertical and diagonal detail component of the wavelet decomposition from horizontal edge enhancement module 660, vertical edge enhancement module 670, and diagonal edge enhancement module 680. Reconstruction module 690 may receive the approximation component (low frequency) of every level of wavelet decomposition without enhancement from wavelet decomposition module 610. In various implementations, the reconstruction module 690 may use the modified frequency components of the luma and/or chorma (Y and/or UV) signals and perform inverse transformation to obtain every image back from the wavelet transforms. The implementations are not limited in this context.

In some cases, if the edge information is weak, weak real signals may be confused with noise. In various implementations, a local noise measurement technique may be used to adaptively decide on the local threshold for noise presence to remedy this situation. The local noise measurement technique may adaptively determine a coring value based on the picture contents. The coring value may be set to a very low percentage of the input signal (YU or V), depending on the picture characteristics. In various implementations, the coring value may be set to 2-4% so that almost 96% of the original values are excluded (assuming a valid Gaussian assumption) to hypothesize the coring threshold in an image. The coring value may be used locally at every decomposition level to measure the level of noise and to give a localized measure both in the time domain (the image itself) and in the frequency domain (every decomposition level). The implementations are not limited in this context.

Returning to FIG. 2, selector 230 may select between the outputs of linear sharpener 210 and non-linear sharpener 220 to output to display buffer 240 based on information from non-linear sharpener 220 (shown as a dotted line in FIG. 2). In some implementations, selector 230 may default to outputting the sharpened video information from non-linear sharpener 220, unless there are particularly sharp edges in the image 620. In the presence of such sharp edges, selector may output the sharpened video information from linear sharpener 210 instead.

In some implementations, selector 230 may use the higher-frequency information in first-level decomposition 630 to determine the presence or absence of sharp edges. Selector 230 may determine areas of high-density spatial frequencies from any one, two, or all three higher-detail components of decomposition 630 (e.g., in the horizontal direction, in the vertical direction, and/or in the diagonal direction). Various schemes and criteria for determining areas of high spatial frequencies are possible. For example, selector 230 may make such determination on a pixel-by-pixel (or groups of pixels) basis by comparing the higher-detail components of decomposition 630 with a threshold. In some implementations, selector 230 may make such determination for a certain number of pixels (or blocks) adjacent to a pixel for which such a threshold is exceeded. In some implementations, selector 230 may determine areas of high-density via a certain number of threshold-exceeding values within a certain area (e.g., block, macroblock, etc.).

Figure 7:
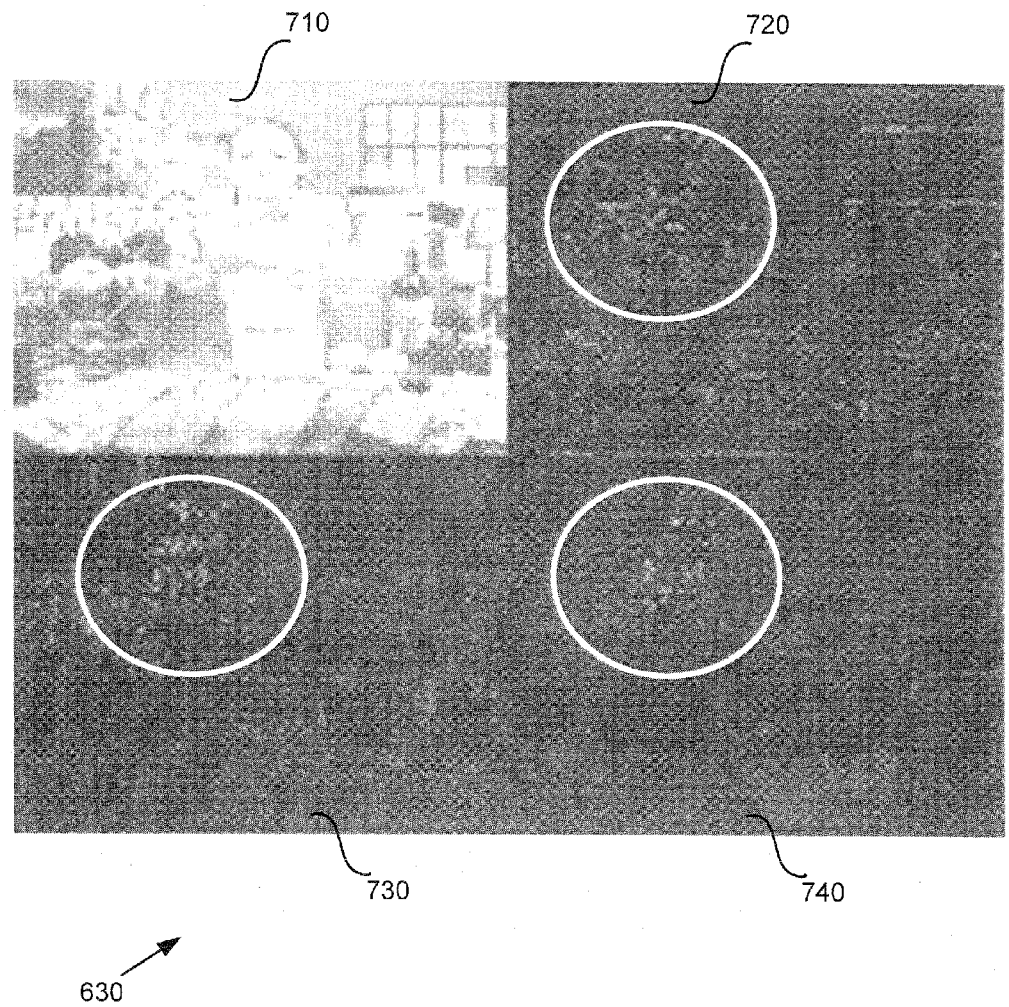
FIG. 7 illustrates an exemplary first order decomposition by the sharpener of FIG. 6.

Purely for the purposes of illustration, FIG. 7 shows an exemplary first-level, 2D wavelet decomposition 630 including a low-detail component 710 and three high-detail components (e.g., including high-frequency information) in a horizontal direction (i.e., horizontal component 720), in a vertical direction (i.e., vertical component 730), and in a diagonal direction (i.e., diagonal component 740). Selector 230 may select the output of linear sharpener 210 for certain pixels corresponding to the circled area(s) of component(s) 720, 730, and/or 740 (e.g., regions high spatial density), and may select the output of non-linear sharpener 220 for all other pixels (e.g., regions low spatial density). Although the claimed invention may be performed using components from a first-level wavelet decomposition 630, it should not be limited thereto, as it may also be performed with higher-level wavelet decompositions and/or other types of transformations to extract, for example, high-frequency components 720-740 or similar high-frequency information.

Returning to FIG. 2, display buffer 240 may receive video data from selector 230, and may temporarily store at least some of such data prior to its output to a display device (not shown). In addition to a buffering (e.g., storage) function, display buffer 240 may perform other display-related tasks, such as synchronizing its output signal to a timing or sync signal to facilitate display. Other functionality that is typically found in display buffers may also be present in display buffer 240.

Figure 8:
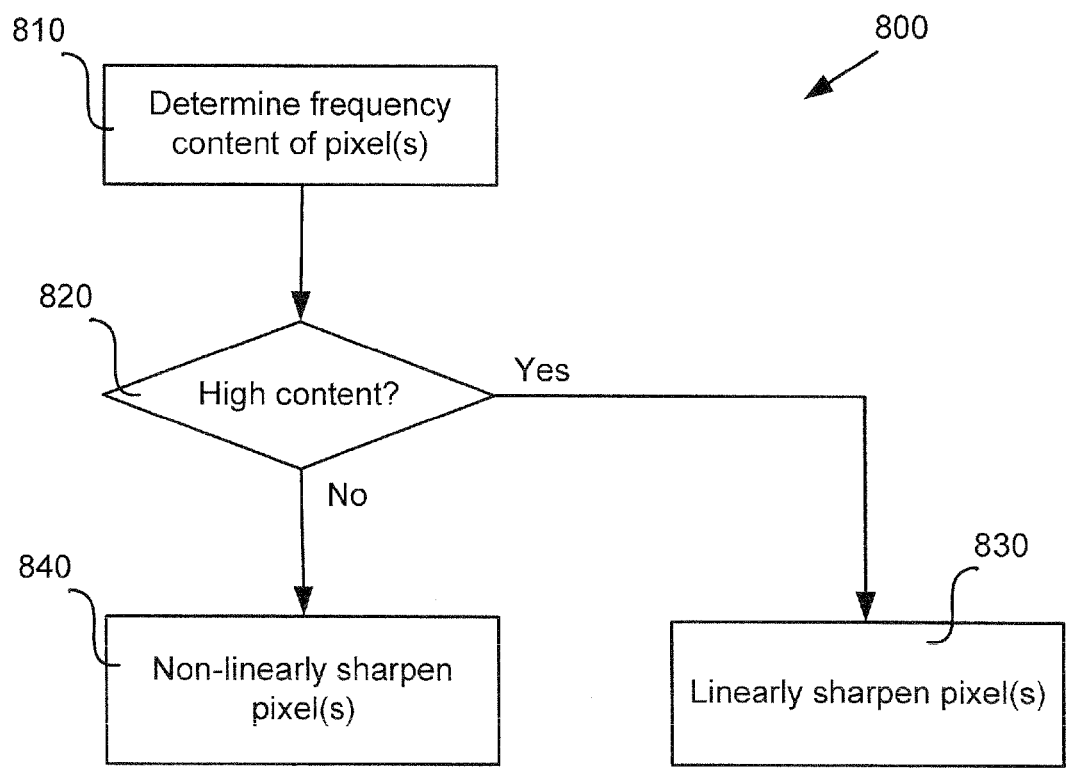
FIG. 8 illustrates an exemplary process of selectively changing the sharpness of video data.

FIG. 8 illustrates an example process 800 of selectively changing the sharpness of video data. Although FIG. 8 may be described with regard to system 200 described in FIGS. 2-7 for ease and clarity of explanation, it should be understood that process 800 may be performed by other hardware and/or software implementations.

Processing may begin by selector 230 determining a frequency content associated with a pixel, or a group of pixels [act 810]. This determination may be made, as previously described, based on frequency content in a first-order wavelet decomposition 630, in any or all of the horizontal, vertical and/or diagonal directions.

If the frequency content of the pixel, or group of pixels, is determined to be high [act 820], selector 230 may output a sharpened pixel value from linear sharpener 210 for this pixel or group of pixels [act 830]. In this manner, system 200 avoids introducing noise and/or other undesirable effects by increasing to a greater degree (e.g., non-linearly) the already high frequency content. Instead, these areas of high frequency content may be sharpened to a lesser degree (e.g., a first order or lower sharpening, which may be generally referred to as "linear").

If the frequency content of the pixel, or group of pixels, is not determined to be high [act 820], selector 230 may output a sharpened pixel value from non-linear sharpener 220 for this pixel or group of pixels [act 840]. In this manner, system 200 may sharpen these areas of relatively low frequency content to a greater degree (e.g., a second order or higher sharpening, which may be generally referred to as "non-linear"). Because an image may typically contain a greater percentage of low-frequency content (e.g., 80%, 90%, 95%, etc.), the greater, non-linear sharpening in act 840 may be considered the "default" case, and act 830 may be performed in the generally smaller number of cases where sharp edges (e.g., high frequency content) are present.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although the scheme described herein may be performed on a pixel-by-pixel basis, it may also be performed for aggregations or groups of pixels in an image. Also as used herein, the terms "linear" and "non-linear" should not be interpreted strictly. Rather, "linear" is used herein as convenient shorthand for first-order or lower (i.e., $0^{th}$ order) sharpening. For example, gain profile 500 includes zero and piecewise linear portions, but it may be considered "linear" in that it contains first-order or lower content. Similarly, "non-linear" as used herein need not necessarily exclude first-order content. Rather, the term "non-linear" as used herein may denote the presence of second-order (e.g., quadratic) or higher sharpening.

Moreover, the scheme described herein should not be limited to the specific implementations disclosed (e.g., selective amplification and wavelet-based), but rather may apply to any technique that sharpens in a super-linear manner, except where high spatial frequencies are present. The claimed invention is intended to encompass any such technique that sharpens such higher-frequency content less, and possibly with a different technique.

Further, at least some of the acts in FIG. 7 may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A system comprising:
   a first device to locate edges in an image using wavelet decomposition modules in horizontal, vertical, and diagonal directions; and
   a second device coupled to said first device to sharpen pixels at said edges by changing components of said wavelet decomposition of different levels differently.

2. The system of claim 1, said first device to use three levels of wavelet decomposition.

3. The system of claim 2, said first device to use wavelet decomposition in horizontal, vertical, and diagonal directions at each of three levels.

4. The system of claim 3, said second device to boost higher frequency components at each of said levels.

5. The system of claim 4, said second device to boost said higher frequency components differently at each level.

6. The system of claim 5, said second device to boost said higher frequency components by a different factor at each level.

7. The system of claim 6, said second device to use a threshold value to distinguish higher and lower frequency components.

8. The system of claim 7, said second device to use different threshold values at each level.

9. The system of claim 8, said second device to use different threshold values for horizontal, vertical, and diagonal directions.

10. A computer readable medium storing instructions that are executed by a computer to:
    locate edges in an image using wavelet decomposition modules in horizontal, vertical, and diagonal directions; and
    sharpen pixels at said edges by changing components of said wavelet decomposition of different levels differently.

11. The medium of claim 10, further storing instructions to use three levels of wavelet decomposition.

12. The medium of claim 11, further storing instructions to use wavelet decomposition in horizontal, vertical, and diagonal directions at each of said three levels.

13. The medium of claim 12, further storing instructions to boost higher frequency components at each of said levels.

14. The medium of claim 13, further storing instructions to boost said higher frequency components differently at each level.

15. The medium of claim 14, further storing instructions to boost said higher frequency components by a different factor at each level.

16. The medium of claim 15, further storing instructions to use a threshold value to distinguish higher and lower frequency components.

17. The medium of claim 16, further storing instructions to use different threshold values at each level.

18. The medium of claim 17, further storing instructions to use different threshold values for horizontal, vertical, and diagonal directions.

19. A method comprising:
    locating, using a processor, edges in an image using wavelet decomposition modules in horizontal, vertical, and diagonal directions; and
    sharpening, using the processor, pixels at said edges by changing components of said wavelet decomposition of different levels differently.

20. The method of claim 19, including using three levels of wavelet decomposition.

21. The method of claim 20, including using wavelet decomposition in horizontal, vertical, and diagonal directions at each of said three levels.

22. The method of claim 21, including boosting higher frequency components at each of said levels.

23. The method of claim 22, including boosting said higher frequency components differently at each level.

24. The method of claim 23, including boosting said higher frequency components by a different factor at each level.

25. The method of claim 24, including using a threshold value to distinguish higher and lower frequency components.

26. The method of claim 25, including using different threshold values at each level.

27. The method of claim 26, including using different threshold values for horizontal, vertical, and diagonal directions.

* * * * *